(12) United States Patent
Jung et al.

(10) Patent No.: US 9,426,766 B2
(45) Date of Patent: Aug. 23, 2016

(54) METHOD AND APPARATUS FOR ESTABLISHING SYNCHRONIZATION AND TRANSMITTING/RECEIVING SIGNAL IN BEAMFORMING SYSTEM

(71) Applicant: Samsung Electronics Co., Ltd., Gyeonggi-do (KR)

(72) Inventors: Jung-Soo Jung, Gyeonggi-do (KR); Hyun-Jeong Kang, Seoul (KR); Suk-Won Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 47 days.

(21) Appl. No.: 14/322,884

(22) Filed: Jul. 2, 2014

(65) Prior Publication Data

US 2015/0009984 A1    Jan. 8, 2015

(30) Foreign Application Priority Data

Jul. 2, 2013    (KR) .................... 10-2013-0077223

(51) Int. Cl.
*H04W 56/00*    (2009.01)
(52) U.S. Cl.
CPC ............................. *H04W 56/0055* (2013.01)
(58) Field of Classification Search
CPC ............................................... H04W 56/0055
See application file for complete search history.

(56) References Cited

U.S. PATENT DOCUMENTS

| | | | |
|---|---|---|---|
| 2012/0307726 A1* | 12/2012 | Pi | H04J 11/0069 370/328 |
| 2013/0039345 A1 | 2/2013 | Kim et al. | |
| 2013/0064239 A1 | 3/2013 | Yu et al. | |
| 2013/0102345 A1 | 4/2013 | Jung | |
| 2013/0121185 A1* | 5/2013 | Li | H04W 72/046 370/252 |
| 2014/0161110 A1* | 6/2014 | Kim | H04L 5/001 370/336 |

OTHER PUBLICATIONS

International Search Report dated Oct. 10, 2014 in connection with International Application No. PCT/KR2014/005897; 3 pages.
Written Opinion of International Searching Authority dated Oct. 10, 2014 in connection with International Application No. PCT/KR2014/005897; 6 pages.

* cited by examiner

*Primary Examiner* — Jae Y Lee

(57) ABSTRACT

A method of establishing synchronization with a base station by a mobile station in a communication system using beamforming includes: receiving a downlink signal transmitted through at least one transmission beam by using at least one reception beam; determining at least one of a propagation delay and a signal strength of the received downlink signal for each downlink transmission/reception beam pair through which the downlink signal is transmitted/received, wherein each downlink transmission/reception beam pair includes a transmission beam through which the downlink signal is transmitted from the base station and a reception beam through which the downlink signal is received by the mobile station; and establishing a downlink frame boundary of the mobile station by using the determined at least one of the propagation delay and the signal strength for each downlink transmission/reception beam pair.

32 Claims, 13 Drawing Sheets

METHOD AND APPARATUS FOR ESTABLISHING SYNCHRONIZATION AND TRANSMITTING/RECEIVING SIGNAL IN BEAMFORMING SYSTEM

CROSS-REFERENCE TO RELATED APPLICATION(S) AND CLAIM OF PRIORITY

The present application is related to and claims the priority under 35 U.S.C. §119(a) to Korean Application Serial No. 10-2013-0077223, which was filed in the Korean Intellectual Property Office on Jul. 2, 2013, the entire content of which is hereby incorporated by reference.

TECHNICAL FIELD

The present disclosure relates to a method and apparatus for establishing synchronization between a mobile station and a base station, and transmitting/receiving an uplink signal in a beamforming system using one or more transmission/reception beams.

BACKGROUND

With the popularization of mobile terminals, such as smartphones, the average amount of data consumed by mobile communication users has increased significantly, and thus there is an ever-increasing demand for higher data rates. In general, a method for providing a high data rate may be divided into using a wide frequency band and increasing frequency utilization efficiency. However, it is very difficult to provide a higher average data rate through the latter method. This is because the frequency utilization efficiency supported by contemporary communication technologies has already nearly reached the theoretical limit, which makes it very difficult to achieve a further increase in the frequency utilization efficiency through technical improvements. Accordingly, under the present circumstances, a more feasible method for increasing data rates is to provide a data service over a wider frequency band. With regard to this, an available frequency band must be taken into consideration. Under the current frequency distribution policy, available broadband communication bands of 1 GHz or greater are limited, and the actually selectable frequency bands include only the millimeter wave bands above 30 GHz. In such high frequency bands, unlike the 2 GHz band used by the conventional cellular systems, signals suffer severe distance-dependent attenuation. Due to the signal attenuation, when a base station uses the same power as in the conventional cellular systems, its service coverage may be considerably decreased. In order to solve this problem with the service coverage, a beamforming technique is widely used to increase the transmission/reception efficiency of an antenna by concentrating transmission/reception power in a narrow space.

SUMMARY

To address the above-discussed deficiencies, it is a primary object to provide a method and apparatus for establishing synchronization with a base station by a mobile station in a communication system using beamforming.

The present disclosure provides a method and apparatus for determining the transmission time of an uplink signal by a mobile station in a communication system using beamforming.

The present disclosure provides a method and apparatus for determining a timing advance (TA) value for an uplink transmission time of a mobile station by a base station in a communication system using beamforming.

The present disclosure provides a method of establishing synchronization with a base station by a mobile station in a communication system using beamforming. The method includes: receiving a downlink signal, transmitted through at least one transmission beam, by using at least one reception beam; determining at least one of a propagation delay and a signal strength of the received downlink signal for each downlink transmission/reception beam pair through which the downlink signal is transmitted/received; and establishing a downlink frame boundary of the mobile station by using the determined at least one of the propagation delay and the signal strength for each downlink transmission/reception beam pair.

The present disclosure provides a method of determining a timing advance (TA) value for an uplink transmission time of a mobile station by a base station in a communication system using beamforming. The method includes: receiving an uplink signal, transmitted through at least one transmission beam, by using at least one reception beam; determining at least one of a propagation delay and a signal strength of the received uplink signal for each uplink transmission/reception beam pair through which the uplink signal is transmitted/received; and determining the TA value by using the determined at least one of the propagation delay and the signal strength for each uplink transmission/reception beam pair.

The present disclosure provides a mobile station for establishing synchronization with a base station in a communication system using beamforming. The mobile station includes: a transceiver that receives a downlink signal, transmitted through at least one transmission beam, by using at least one reception beam; and a controller that determines at least one of a propagation delay and a signal strength of the received downlink signal for each downlink transmission/reception beam pair through which the downlink signal is transmitted/received, and establishes a downlink frame boundary (or downlink frame synchronization) of the mobile station by using the determined at least one of the propagation delay and the signal strength for each downlink transmission/reception beam pair.

The present disclosure provides a base station for determining a timing advance (TA) value for an uplink transmission time of a mobile station in a communication system using beamforming. The base station includes: a transceiver that receives an uplink signal, transmitted through at least one transmission beam, by using at least one reception beam; and a controller that determines at least one of a propagation delay and a signal strength of the received uplink signal for each uplink transmission/reception beam pair through which the uplink signal is transmitted/received, and determines the TA value by using the determined at least one of the propagation delay and the signal strength for each uplink transmission/reception beam pair.

According to the method and apparatus of the present disclosure, in a beamforming system using at least one transmission/reception beam, a mobile station can establish frame synchronization considering the propagation delay and/or signal strength of a downlink signal for each transmission/reception beam pair through which a base station transmits the downlink signal, the mobile station can determine the transmission time of an uplink signal, and the base station can determine a timing advance value for the uplink transmission time of the mobile station considering the propagation delay and/or signal strength of an uplink signal for each transmission/reception beam pair through which the mobile station transmits the uplink signal. Therefore, the beamforming system can be efficiently configured, resulting in an increase in data rate.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
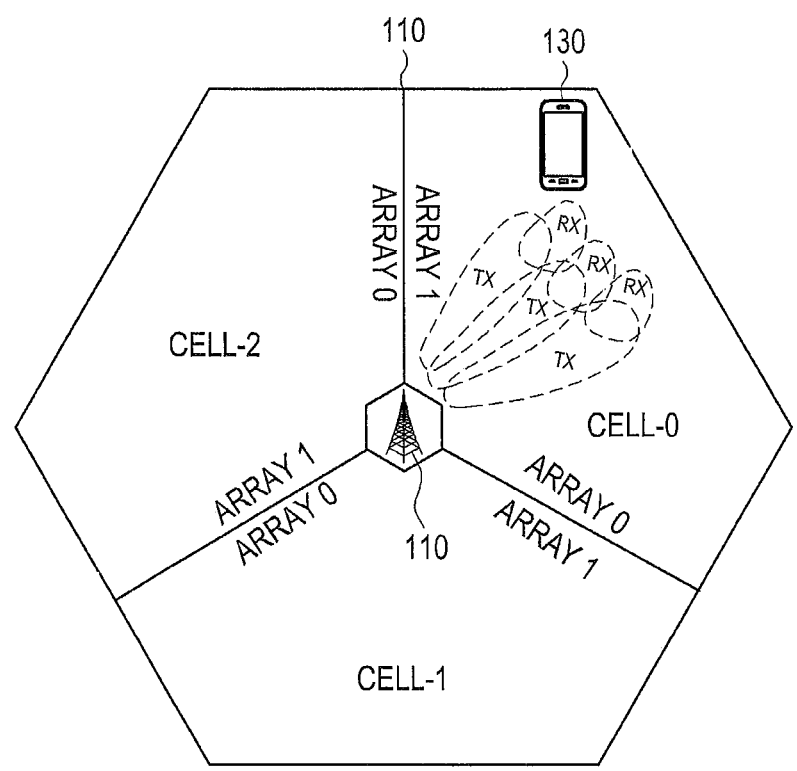
FIG. 1 illustrates a scenario where beamforming is performed between a base station and a mobile station through array antennas in a communication system according to the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Hereinafter, the present disclosure will be described in detail with reference to the accompanying drawings. The present disclosure may have various embodiments, while modifications and changes may be made therein. Therefore, the present disclosure will be described in conjunction with particular embodiments shown in the accompanying drawings. However, it should be understood that there is no intent to limit the present disclosure to the particular forms disclosed herein; rather, the present disclosure should be construed to cover all modifications, equivalents, and/or alternatives falling within the spirit and scope of the disclosure. In the description of the drawings, identical or similar reference numerals are used to designate identical or similar elements.

As used herein, the expression "include" or "may include" refers to the existence of a corresponding function, operation, or element, and does not exclude one or more additional functions, operations, or elements. Also, as used herein, the terms "include" and/or "have" should be construed to denote a certain feature, number, step, operation, element, component or a combination thereof, and should not be construed to exclude the existence or possible addition of one or more other features, numbers, steps, operations, elements, components, or combinations thereof.

Also, as used here, the expression "or" includes any or all combinations of words enumerated together. For example, the expression "A or B" may include A, may include B, or may include both A and B.

In the present disclosure, the expressions "a first", "a second", "the first", "the second", and the like may modify various elements, but the corresponding elements are not limited by these expressions. For example, the above expressions do not limit the sequence and/or importance of the corresponding elements. The above expressions may be used merely for the purpose of distinguishing one element from the other elements. For example, although both a first user device and a second user device are user devices, they indicate different user devices. For example, a first element may be termed a second element, and similarly, a second element may be termed a first element without departing from the scope of the present disclosure.

When an element is referred to as being "coupled" or "connected" to any other element, it should be understood that not only the element may be directly coupled or connected to the other element, but also a third element may be interposed therebetween. Contrarily, when an element is referred to as being "directly coupled" or "directly connected" to any other element, it should be understood that no element is interposed therebetween.

The terms used herein are used only to describe particular embodiments, and are not intended to limit the present disclosure. As used herein, the singular forms may include the plural forms as well, unless the context clearly indicates otherwise.

Unless defined otherwise, all terms used herein, including technical and scientific terms, have the same meaning as those commonly understood by a person of ordinary skill in the art to which the present disclosure pertains. Such terms as those defined in a generally used dictionary are to be interpreted to have the meaning equal to the contextual meaning in the relevant field of art, and are not to be interpreted to have ideal or excessively formal meaning unless clearly defined in the present disclosure.

Although embodiments of the present disclosure described below will be separated for the convenience of description, two or more embodiments may be combined so long as they do not conflict with each other.

An entity according to the present disclosure may be, but not limited to, an apparatus with a communication function incorporated therein. The entity, for example, may include at least one of a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, and a wearable device (e.g., a head-mounted-device (HMD) such as electronic glasses, electronic clothes, an electronic bracelet, an electronic necklace, an electronic appcessory, an electronic tattoo, or a smartwatch).

According to some embodiments, the entity may be a smart home appliance with a communication function. The smart home appliance, for example, may include at least one of a television, a digital video disk (DVD) player, an audio player, a refrigerator, an air conditioners, a cleaner, an oven, a microwave oven, a washing machine, an air purifier, a set-top box, a TV box, a game console, an electronic dictionary, an electronic key, a camcorder, and an electronic frame.

According to some embodiments, the entity may include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), an in-vehicle infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) of a store.

According to some embodiments, the entity may include at least one of a part of furniture or a building/structure having a communication function, an electronic board, an electronic signature-receiving device, a projector, and various kinds of measuring instruments (e.g., a water meter, an electric meter, a gas meter, and an electromagnetic wave meter). The entity according to the present disclosure may be a combination of one or more of the above-mentioned various devices. Also, the entity according to the present disclosure may be a flexible device. Further, it will be apparent to those skilled in the art that the entity according to the present disclosure is not limited to the above-mentioned devices.

A method and apparatus proposed in embodiments of the present disclosure may be applied to various communication systems, such as a long term evolution (LTE) mobile communication system, a LTE-advanced (LTE-A) mobile communication system, a high speed downlink packet access (HSDPA) mobile communication system, a high speed uplink packet access (HSUPA) mobile communication system, a $3^{rd}$ generation project partnership 2 (3GPP2) high rate packet data (HRPD) mobile communication system, a 3GPP2 wideband code division multiple access (WCDMA) mobile communication system, a 3GPP2 code division multiple access (CDMA) mobile communication system, an institute of electrical and electronics engineer (IEEE) 802.16m communication system, an evolved packet system (EPS), and a mobile Internet protocol (Mobile IP) system.

Before giving a detailed description of the present disclosure, it is helpful to give a brief overview of the present disclosure.

FIG. 1 illustrates a scenario where beamforming is performed between a base station and a mobile station through array antennas in a communication system.

Referring to FIG. 1, the base station (BS) 110 can transmit data while changing the direction of a downlink transmission (Tx) beam by using a plurality of array antennas Array 0 and Array 1 in each cell. The mobile station (MS) 130 can also receive data while changing the direction of a reception (Rx) beam. In the communication system using beamforming, the BS 110 and the MS 130 transmits and receives data by selecting the direction of a Tx beam and the direction of a Rx beam, which show the optimal channel environment, from among various directions of Tx beams and various directions of Rx beams. This technique may be equally applied not only to a downlink channel over which data is transmitted from the BS 110 to the MS 130, but also to an uplink channel over which data is transmitted from the MS 130 to the BS 110.

Assuming that the number of directions of Tx beams through which the BS 110 can transmit data is N, and the number of directions of Rx beams through which the MS 130 can receive data is M, the simplest way to select the optimal downlink Tx/Rx direction is that the BS 110 transmits a predetermined signal at least M times in each of the N possible Tx beam directions, and the MS 130 receives each of the N Tx beams by using the M Rx beams. Accordingly, in the communication system using beamforming, the BS 110 has to transmit a specific reference signal at least N×M times, and the MS 130 has to receive the reference signal N×M times and measure the signal strength of each received reference signal. The MS 130 may determine, as the optimal Tx/Rx beam direction, the direction that shows the highest signal strength among the N×M measured signal strengths. As such, the process of transmitting a signal one or more times in all possible Tx beam directions by the BS 110 is called a beam sweeping process, and the process of selecting the optimal Tx/Rx beam direction by the MS 130 is called a beam selection process. This optimal downlink Tx/Rx beam selection process may also be equally applied to an uplink Tx/Rx process of transmitting data from the MS 130 to the BS 110.

Figure 2:
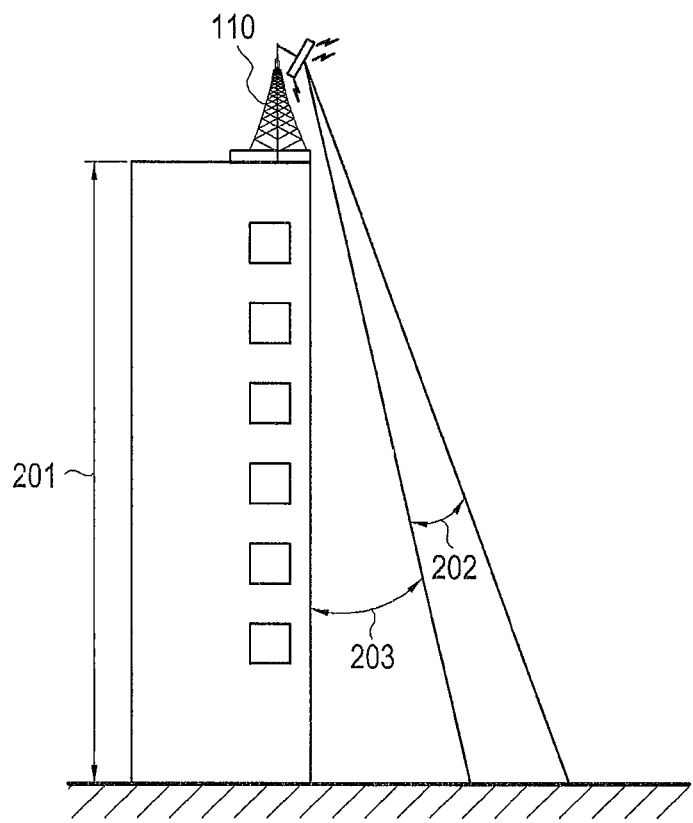
FIG. 2 illustrates an example in which a base station 110 transmits/receives a signal through a beam having a predetermined beam width in a communication system using beamforming according to the present disclosure.

FIG. 2 illustrates an example in which a base station 110 transmits/receives a signal through a beam having a predetermined beam width in a communication system using beamforming. It is assumed in FIG. 2 that the BS 110 is installed in a location having a certain height 201 from the ground, and has a predetermined beam width 202. The beam width 202 of the BS may be defined for each of the elevation angle and the azimuth. The example of FIG. 2 shows that the BS 110 transmits/receives a beam in the direction corresponding to the predetermined elevation angle 203.

Figure 3:
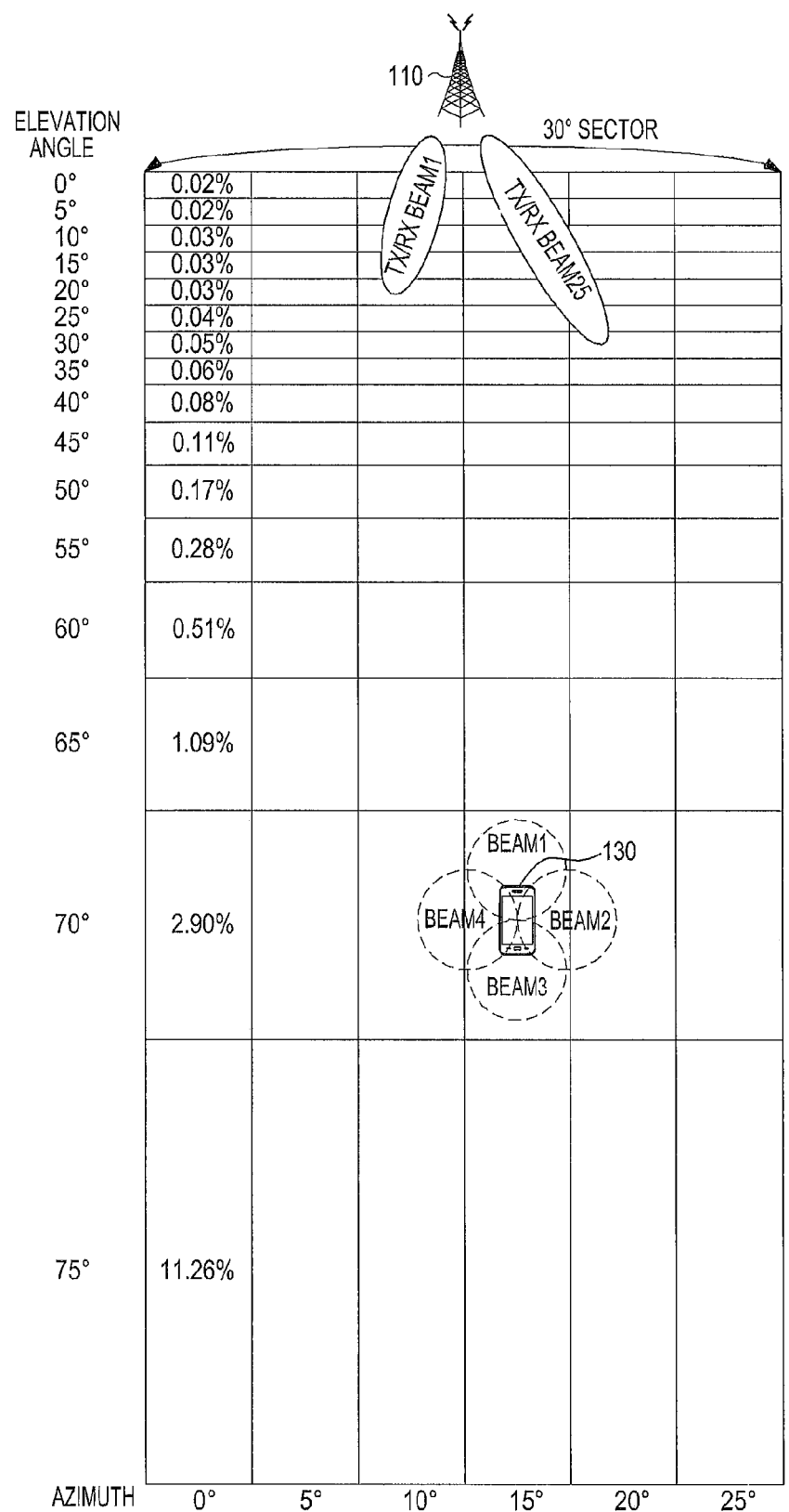
FIG. 3 illustrates the number of downlink Tx beams and the number of Rx beams that a base station and a mobile station can use respectively when the base station is installed in a manner as shown in FIG. 2 according to the present disclosure.

FIG. 3 illustrates the number of downlink Tx beams and the number of Rx beams that a base station and a mobile station can use respectively when the base station is installed in a manner as shown in FIG. 2. Although FIG. 3 will be described in connection with a downlink channel over which the BS 110 transmits a signal and the MS 130 receives the signal, the example given in FIG. 3 may also be applied to an uplink channel over which the MS 130 transmits a signal and the BS 110 receives the signal.

In FIG. 3, it is assumed that the BS 110 is installed at a height of 35 meters (m) from the ground, the BS 110 transmits a Tx beam having a beam width of 5° with respect to each of the elevation angle and the azimuth in one sector having an angle of 30° and a coverage of 200 m, the number of downlink Tx beams that the BS 110 can use to transmit a signal is 96, and the number of downlink Rx beams that the MS 130 can use to receive the signal transmitted by the BS 110 is 4. If there is no obstacle, then a Tx beam transmitted by the BS 110 is spread in a fan shape. However, for the sake of convenience, it is assumed in the example of FIG. 3 that each Tx beam reaches the ground in a rectangular shape. The rectangles in FIG. 3 represent ninety-six regions where Tx beams reach the ground according to specific elevation angles and specific azimuths. The ninety-six Tx beams are transmitted to a farther region as the elevation angle is increased, and the Tx beam transmitted to a farther distance is received in a wider region as it is far away from the BS 110. In FIG. 3, the percentage filled in each rectangle represents the area ratio of a region where a Tx beam transmitted to a specific location is received, that is, the corresponding rectangle, to the total of 96 regions. As can be seen from FIG. 3, a Tx beam transmitted to the boundary area of the BS 110 is received in a much wider region than a Tx beam transmitted to a place close to the center of the BS 110, even when the Tx beams have the same elevation angle and azimuth. In the example of FIG. 3 where it is assumed that the BS 110 is installed at a height of 35 m and the sector has a coverage of 200 m, the difference between the areas of Rx regions reaches upward of a maximum of 480 times. In the beamforming communication system, it is difficult for the MS to form a number of Tx/Rx beams having a narrow beam width like the BS because it has limitations on the physical space, capabilities, price, and the like. In the case shown in FIG. 3, the MS 130 forms four Rx beams (beam 1, beam 2, beam 3, and beam 4) and uses them to receive a Tx beam transmitted by the BS. In this case, each Rx beam has a beam width of about 90° with respect to the azimuth.

Figure 4:
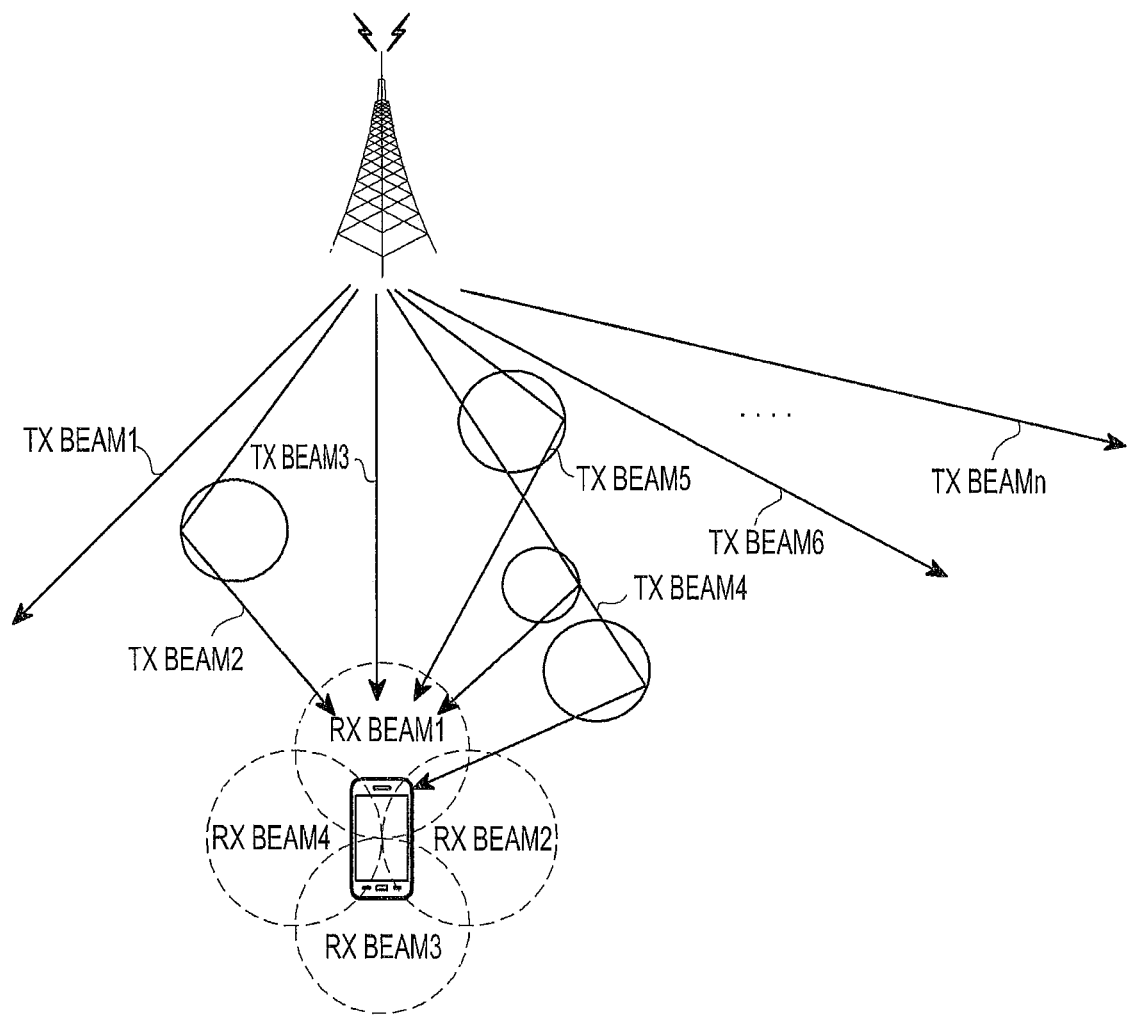
FIG. 4 illustrates different paths over which Tx/Rx beams are transmitted/received between a base station installed in a manner as shown in FIG. 3 and a mobile station according to the present disclosure.

FIG. 4 illustrates different paths over which Tx/Rx beams are transmitted/received between a base station installed in a manner as shown in FIG. 3 and a mobile station.

In FIG. 4, a downlink signal transmitted by the BS through one of different Tx beams (Tx beam 1 to Tx beam n) is received through one of different Rx beams (Rx beam 1 to Rx beam 4) of the MS. The downlink signal received through a different pair of the Tx/Rx beams passes through a different wireless channel. Consequently, even for the same signal, its reception performance and propagation delay vary according to Tx/Rx beams. That is, downlink signals received through different Tx/Rx beam pairs of (Tx beam 2, Rx beam 1), (Tx beam 3, Rx beam 1), (Tx beam 4, Rx beam 1), and (Tx beam 5, Rx beam 1) have different signal strengths and different propagation delays.

The present disclosure proposes a method of establishing downlink frame synchronization by a mobile terminal, a method of determining the transmission time of an uplink signal by a mobile station after establishing downlink frame synchronization, and a method of determining a timing advance (TA) value for adjusting the uplink transmission time of a mobile station, by using an uplink signal received from the corresponding mobile station, by a base station in a communication system using beamforming.

First of all, in FIG. 8 and FIG. 11, the method of establishing downlink frame synchronization by a mobile terminal, that is, establishing the downlink frame boundary of a mobile station, in a communication system using beamforming will be described. Firstly, among one or more Tx/Rx beam pairs through which a mobile station receives reference signals from a base station, a Tx/Rx beam pair associated with the reference signal having the smallest propagation delay among the received reference signals is determined, and the time corresponding to the frame boundary of the reference signal received through the determined Tx/Rx beam pair is established as the downlink frame boundary of the mobile station. Secondly, among one or more Tx/Rx beam pairs through which a mobile station receives reference signals from a base station, Tx/Rx beam pairs associated with a predetermined number of reference signals having the smallest propagation delay among the received reference signals are determined, and the average frame boundary of the reference signals received through the determined Tx/Rx beam pairs is established as the downlink frame boundary of the mobile station. Thirdly, among one or more Tx/Rx beam pairs through which a mobile station receives reference signals from a base station, a Tx/Rx beam pair associated with the strongest reference signal among the received reference signals is determined, and the time corresponding to the frame boundary of the reference signal received through the determined Tx/Rx beam pair is established as the downlink frame boundary of the mobile station. Fourthly, among one or more Tx/Rx beam pairs through which a mobile station receives reference signals from a base station, Tx/Rx beam pairs associated with a predetermined number of reference signals having the strongest signal strength, that is, k strongest reference signals, among the received reference signals are determined, and the average frame boundary of the reference signals received through the determined Tx/Rx beam pairs is established as the downlink frame boundary of the mobile station.

In FIG. 9A-C and FIG. 12, the method of determining the transmission time of an uplink signal by a mobile station after establishing downlink frame synchronization will be described. Firstly, the uplink transmission time is determined by the starting time of an interval where an uplink resource is allocated, which is common to all uplink Tx beams. However, this method does not consider the fact that Tx/Rx beams have different propagation delays. Secondly, in consideration of the different propagation delays of downlink Tx/Rx beams, the transmission time of each of uplink random access signals is determined by the time delayed by a predetermined period of time from each starting time of intervals where uplink random access resources are allocated.

Figure 10:
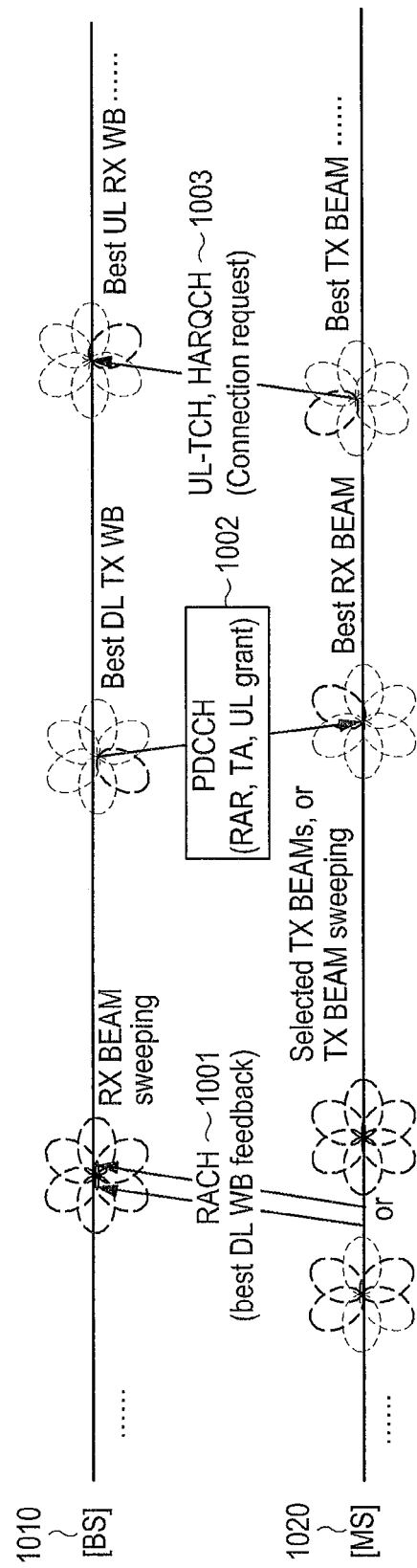
FIG. 10 illustrates a method of determining a TA value for the uplink signal transmission time of a mobile station and signaling the determined TA value to the mobile station according to embodiments of the present disclosure.
Figure 13:
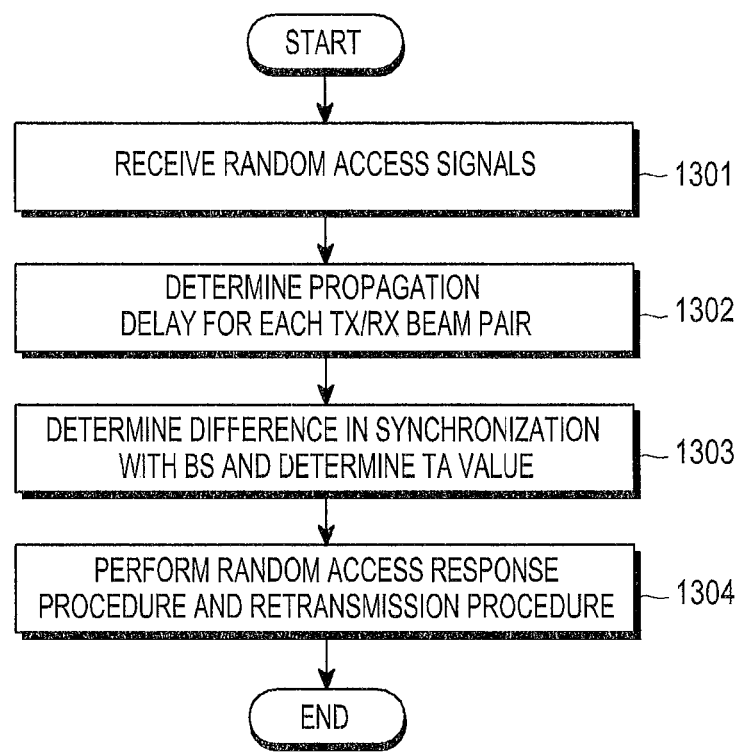
FIG. 13 illustrates a procedure of determining a TA value for the uplink signal transmission time of a specific mobile station by a base station according to embodiments of the present disclosure.

In FIG. 10 and FIG. 13, the method of determining a correction value (timing advance (TA) value) for correcting the uplink transmission time of a mobile station, by using an uplink signal transmitted by the mobile station at the determined transmission time, by a base station will be described. Firstly, a TA value is determined based on the reception time of an uplink signal having the smallest propagation delay among uplink signals received through one or more Tx/Rx beams. Secondly, a TA value is determined based on the average of the reception times of a predetermined number of uplink signals having the smallest propagation delay. The base station determines a TA value by the time difference between the reception time of a received uplink signal and the starting time of an interval where a transmission resource for the uplink signal is allocated or the average of the time differences between the reception times of received uplink signals and the starting times of intervals where transmission resources for the uplink signals are allocated.

Before the present disclosure as discussed above is described in detail, a description will be given of a procedure in which a base station transmits a reference signal, a mobile station establishes frame synchronization and transmits an uplink signal, and the base station receives the uplink signal.

Figure 5:
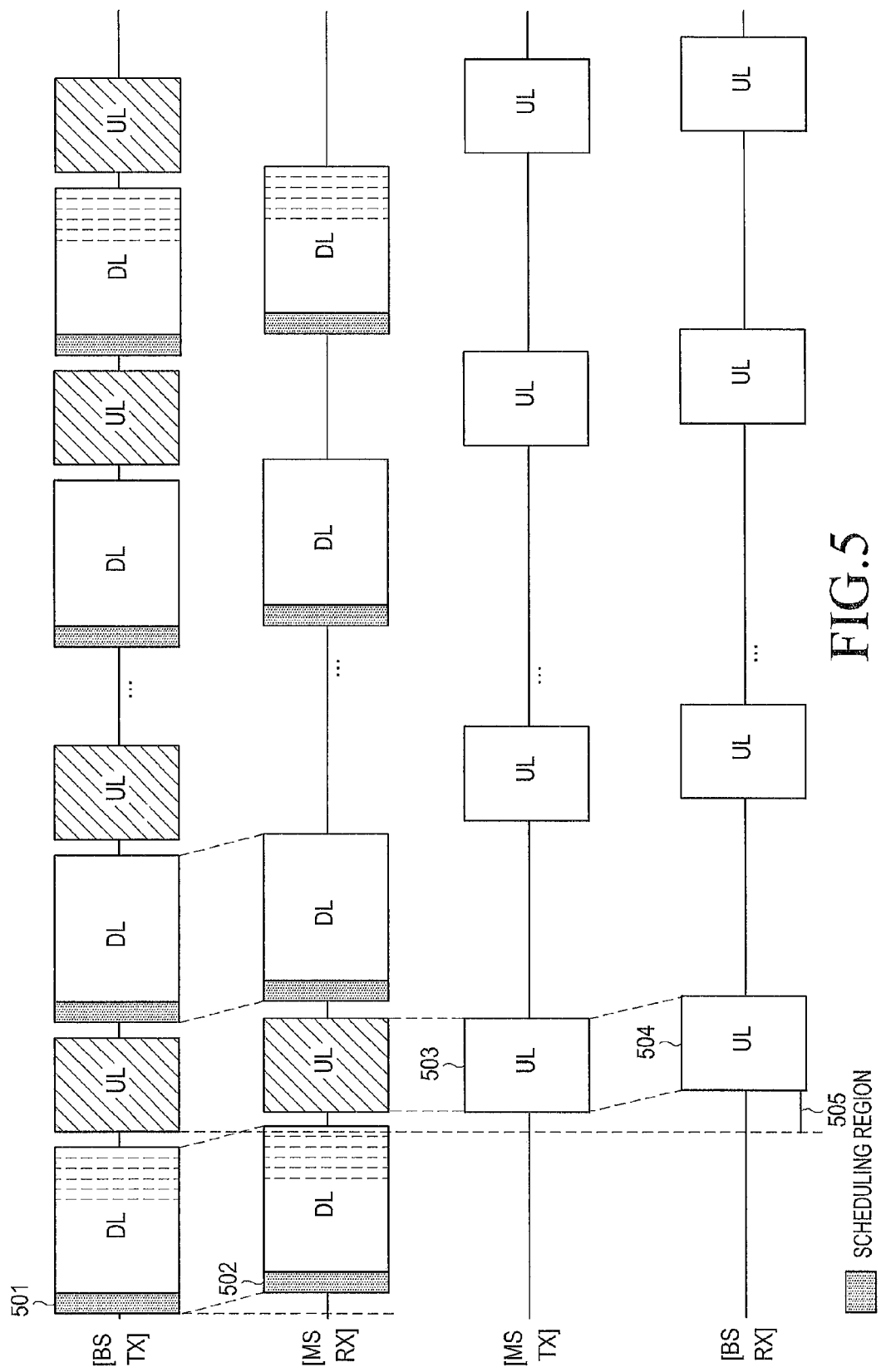
FIG. 5 illustrates frame synchronization and uplink signal transmission/reception between a base station and a mobile station in a communication system using typical time division duplexing (TDD) according to the present disclosure.

FIG. 5 illustrates frame synchronization and uplink signal transmission/reception between a base station and a mobile station in a communication system using typical time division duplexing (TDD).

In a typical mobile communication system, a BS transmits a downlink signal based on its own timing source or reference, as in the example indicated by reference numeral 501. The downlink signal 501 transmitted by the BS undergoes different downlink wireless channels and propagation delays, and then is received by each MS, as in the example indicated by reference numeral 502. Each MS establishes downlink frame synchronization by using the received downlink signal as a timing reference. Each MS determines the transmission time of an uplink signal by using the downlink frame synchronization, as in the example indicated by reference numeral "503", and transmits the uplink signal at the determined transmission time.

The uplink signal transmitted by each MS undergoes different uplink wireless channels and propagation delays, and then is received by the BS, as in the example indicated by reference numeral 504. The uplink signals received by the BS from each MS undergo different propagation delays. Accordingly, in order to avoid intra-cell interference or inter-symbol interference, the BS needs to adjust the transmission time of each MS such that signals transmitted by each MS reach the BS at the same point of time. To this end, the BS determines a transmission time correction value (timing advance (TA) value) for allowing each MS to correct the transmission timing of an uplink signal, based on the uplink signal received from each MS, and transmits the determined TA value to each MS, as in the example indicated by reference numeral 505. Upon receiving the TA value, each MS corrects its uplink transmission time considering the received TA value.

However, in a communication system using beamforming, a signal transmitted/received between a BS and a MS has different channels and propagation delays according to Tx/Rx beam pairs. That is, a specific downlink signal transmitted by a BS through different Tx beams undergoes different propagation delays, and then is received by a MS through different Rx beams. Accordingly, each MS needs to establish downlink frame synchronization by using a downlink signal received through different Tx/Rx beam pairs. Further, each MS also needs to determine the transmission starting time of an uplink signal when transmitting the uplink signal by using a specific Tx beam. In addition, a BS may also receive an uplink signal transmitted by a MS through one or more Tx/Rx beam pairs. Since the uplink signal has different channels and propagation delays according to the Tx/Rx beam pairs, there are one or more reception times of the uplink signal. Accordingly, it is necessary to determine a TA value for the uplink transmission of a specific MS.

Figure 6:
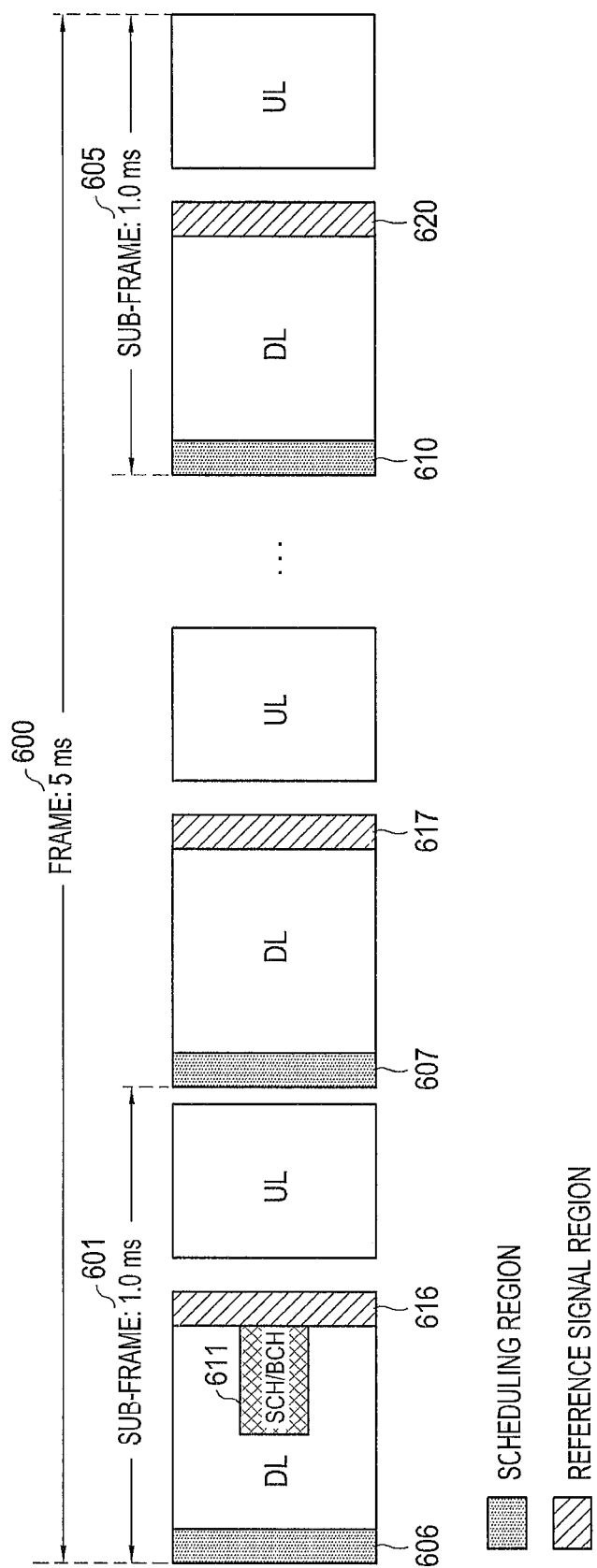
FIG. 6 illustrates an example of a frame structure for transmitting/receiving a signal in a communication system using beamforming according to embodiments of the present disclosure.

FIG. 6 illustrates an example of a frame structure for transmitting/receiving a signal in a communication system using beamforming according to embodiments of the present disclosure.

Referring to FIG. 6, one frame 600 has a length of 5 ms and includes five sub-frames 601-605. Each of the sub-frames is divided into a downlink (DL) Tx interval in which a signal is transmitted from a BS to a MS and an uplink (UL) Tx interval in which a signal is transmitted from the MS to the BS. Further, a part of the DL Tx interval is used as a scheduling region 606-610 for transmitting scheduling information, another part of the DL Tx interval is used as a region 611 for transmitting a sync channel (SCH) and a broadcast channel (BCH), and another part of the DL Tx interval is used as a region 616-620 for transmitting a DL reference signal.

According to the method proposed in the present disclosure, a BS transmits DL reference signals through one or more Tx beams, a MS receives the DL reference signals through one or more Rx beams, and the MS establishes DL frame synchronization considering different propagation delays according to the Tx/Rx beam pairs through which the DL reference signals are transmitted/received.

Figure 7:
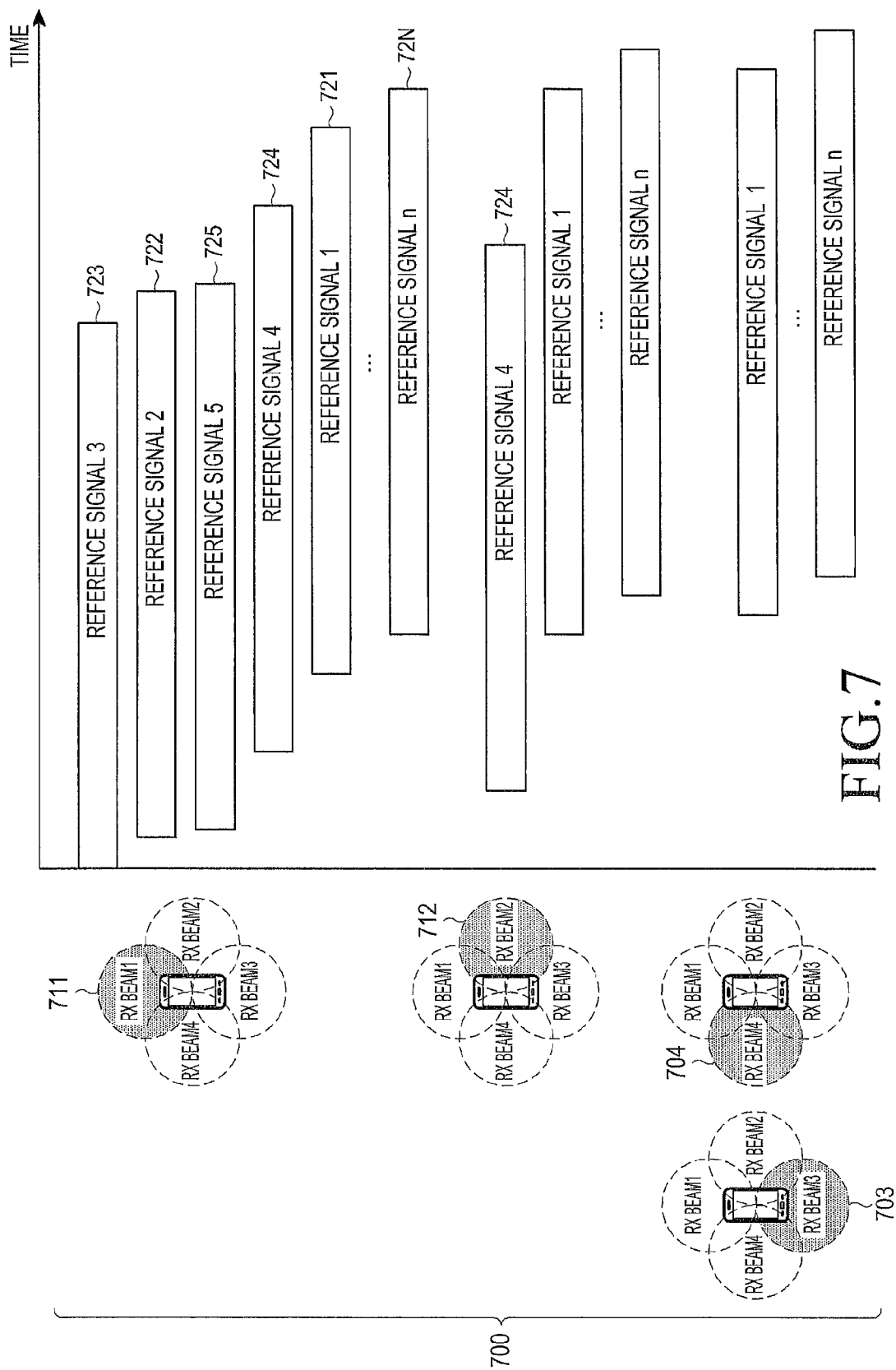
FIG. 7 illustrates an example in which a base station transmits reference signals through one or more transmission beams and a mobile station receives reference signals through one or more reception beams according to embodiments of the present disclosure.

FIG. 7 illustrates an example in which a base station transmits reference signals through one or more transmission beams, and a mobile station receives reference signals through one or more reception beams according to embodiments of the present disclosure.

It is assumed in FIG. 7 that one BS repeatedly transmits reference signals (reference signal 1 to reference signal n), which are associated with n Tx beams (TX1 to TXn) respectively, one or more times by using the n Tx beams, and a MS 700 receives the reference signals by using four Rx beams (RX1 to RX4). Although FIG. 7 includes four MSs 700, they are all the same MS shown for the sake of convenience in order to explain the propagation delay times of reference signals received using Tx/Rx beam pairs. In the example of FIG. 7, among the downlink Tx/Rx beam pairs of the MS 700, the reference signal of the Tx beam TX3 723, received through the Rx beam RX1 711, has the smallest propagation delay. Next to the reference signal received through the Tx/Rx beam pair (TX3, RX1) 723, 711, the reference signal received through the Tx/Rx beam pair (TX2, RX1) 722, 711 has the second smallest propagation delay, the reference signal received through the Tx/Rx beam pair (TX5, RX1) 725, 711 has the third smallest propagation delay, and the reference signal received through the Tx/Rx beam pair (TX4, RX2) 724, 712 has the fourth smallest propagation delay.

Figure 8:
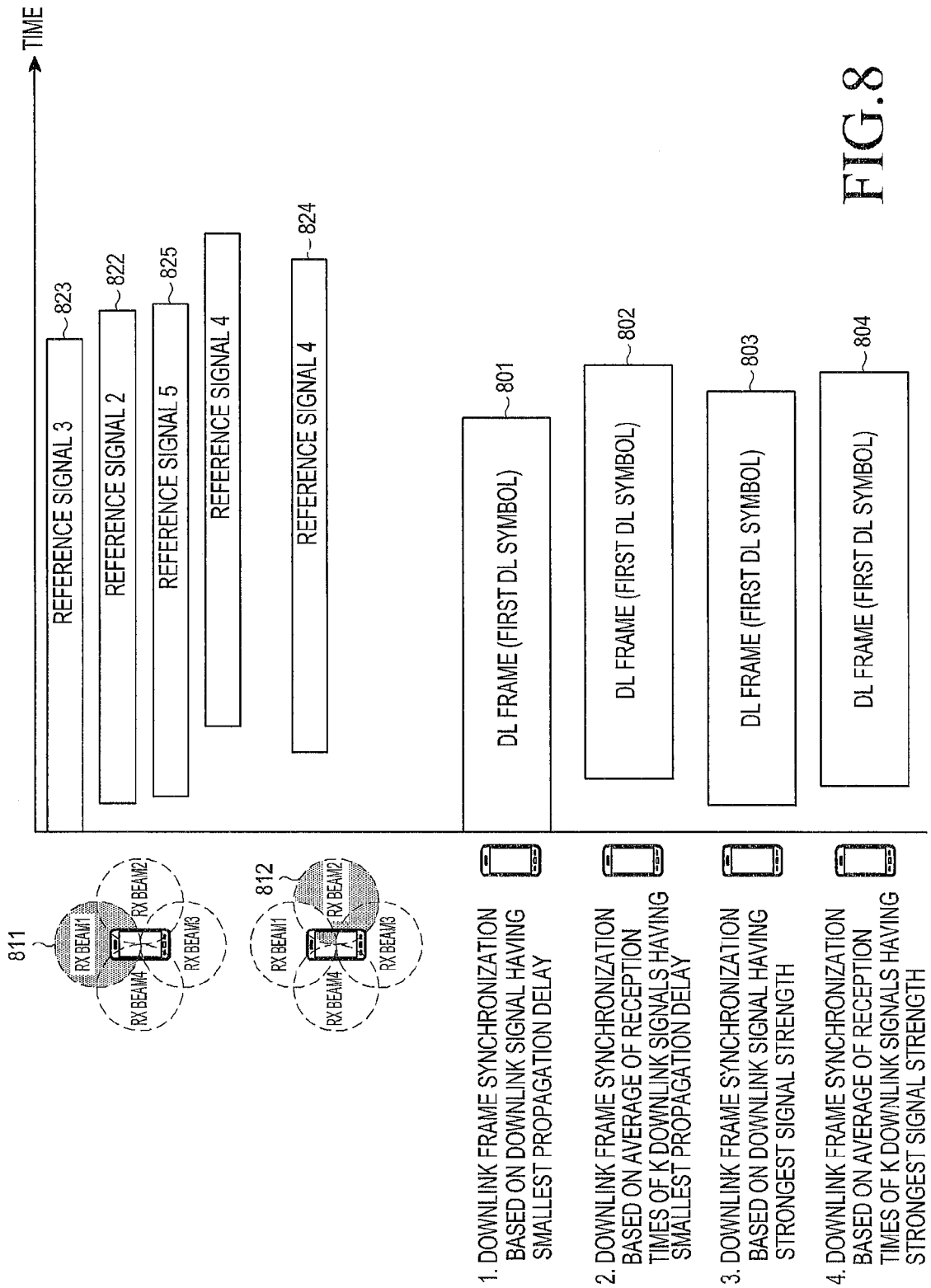
FIG. 8 illustrates a method of establishing a downlink frame boundary by a mobile station according to embodiments of the present disclosure.

FIG. 8 illustrates a method of establishing a downlink frame boundary by a mobile station according to embodiments of the present disclosure. In FIG. 8, among all Tx/Rx beam pairs between a BS and a MS, only four Tx/Rx beam pairs having the first to fourth smallest propagation delays are shown.

In the method indicated by reference numeral 801, the MS determines the Tx/Rx beam pair through which the reference signal having the smallest propagation delay among downlink reference signals received using downlink Tx/Rx beams is received. That is, Tx/Rx beam pair (TX3, RX1) 823, 811. The MS establishes the time corresponding to the frame boundary of the reference signal received through the determined Tx/Rx beam pair (TX3, RX1) 823, 811 as the downlink frame boundary of the MS (i.e., the time at which the first symbol of the downlink frame starts). That is, the time corresponding to the frame boundary of the reference signal received through the Tx/Rx beam pair showing the smallest propagation delay among received reference signals is established as the downlink frame boundary of the MS.

In the method indicated by reference numeral 802, the MS determines a predetermined of Tx/Rx beam pairs through which reference signals having the smallest propagation delay among received downlink reference signals are received, and establishes the average of the frame boundaries of the reference signals received through the determined Tx/Rx beam pairs as the downlink frame boundary of the MS. In the example of FIG. 8, the predetermined number of Tx/Rx beam pairs showing the smallest propagation delay are determined by four Tx/Rx beam pairs (TX3, RX1) 823, 811, (TX2, RX1) 822, 811, (TX5, RX1) 825, 811, and (TX4, RX2) 824, 812 through which four reference signals having the first to fourth smallest propagation delays are received. The average of the frame boundaries of the four reference signals received through the determined four Tx/Rx beam pairs is established as the downlink frame boundary of the MS.

In the method indicated by reference numeral 803, the MS determines the Tx/Rx beam pair through which the strongest reference signal among received downlink reference signals is received. For example, the Tx/Rx beam pair (TX2, RX1) 822, 811, and establishes the frame boundary of the downlink reference signal received through the determined Tx/Rx beam pair (TX2, RX1) 822, 811 as the downlink frame boundary of the MS.

In the method indicated by reference numeral 804, the MS determines a predetermined of Tx/Rx beam pairs through which a predetermined number of reference signals having the strongest signal strength (that is, k strongest reference signals) among received downlink reference signals are received. For example, four Tx/Rx beam pairs (TX2, RX1) 822, 811, (TX3, RX1) 823, 811, (TX5, RX1) 825, 811, and (TX4, RX2) 824, 812 through which the first to fourth strongest reference signals are received. The MS establishes the average of the frame boundaries of the reference signals received through the determined four Tx/Rx beam pairs as the downlink frame boundary of the MS.

However, depending on implementations, the above methods may be considered in combination. That is, the frame boundaries can also be determined in consideration of the propagation delays and/or reception strengths of the reference signals received through the downlink Tx/Rx beam pairs.

Hereinafter, a description will be given of a method of determining the transmission time of an uplink signal by a MS when the MS transmits an uplink random access signal to a BS having one or more Rx beams by using one or more Tx beams after establishing the downlink frame boundary according to the methods described in the example of FIG. 8. In the following description, it will be apparent that the uplink random access signal is merely an example of an uplink signal, and thus the transmission time of a typical uplink signal can also be determined by the method of determining the transmission time of the random access signal as described below.

Figures 9A, 9B, 9C:
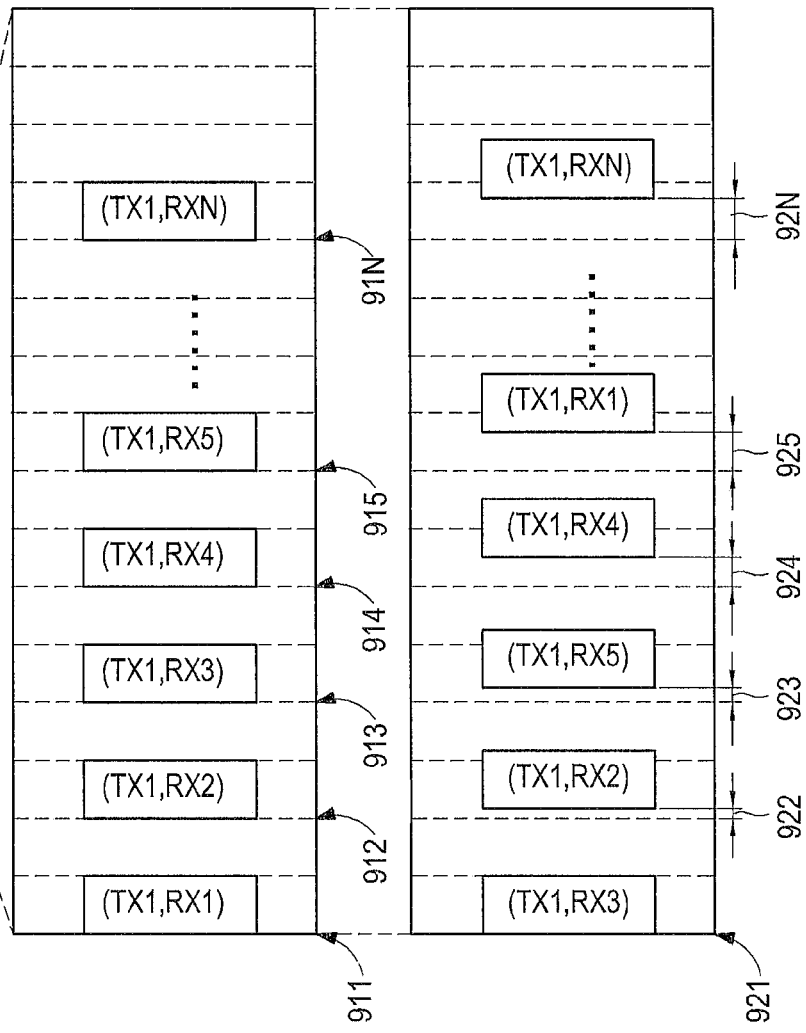
FIGS. 9A, 9B and 9C illustrate a method of determining the transmission times of uplink random access signals by a mobile station according to embodiments of the present disclosure.

FIGS. 9A-9C illustrate a method of determining the transmission times of uplink random access signals by a mobile station according to embodiments of the present disclosure.

FIG. 9A shows an example of an uplink random access resource allocated to a part of the UL interval of a specific sub-frame by a base station. The BS divides an uplink random access resource into one or more time-frequency resources corresponding to Rx beams and deploy the divided time-frequency resources. In FIG. 9A, the uplink random access resource includes a random access time-frequency resource 901 corresponding to Rx beam 1, a random access time-frequency resource 902 corresponding to Rx beam 2, a random access time-frequency resource 903 corresponding to Rx beam 3, a random access time-frequency resource 904 corresponding to Rx beam 4, a random access time-frequency resource 905 corresponding to Rx beam 5, . . . , a random access time-frequency resource 90N corresponding to Rx beam N.

In the uplink transmission time determination method shown in FIG. 9B, the MS establishes downlink frame synchronization, based on received downlink signals. The MS determines the starting time of each uplink random access resource 901 to 906 of FIG. 9A (which is determined based on its downlink frame boundary) as the transmission times of random access signals. This method does not consider the fact that downlink Tx/Rx beams have different propagation delays. In FIG. 9B, for example, the MS transmits a random access signal by using the uplink Tx/Rx beam pair (TX1, RX1) and the random access resource 901. The MS determines the transmission time of the random access signal corresponds to the time 911 that is the same as the starting time of the interval where the random access resource 901 is allocated. Further, the MS transmits a random access signal by using the uplink Tx/Rx beam pair (TX1, RX2) and the random access resource 902, and the transmission time of the random access signal corresponds to the time 912 that is the same as the starting time of the interval where the random access resource 902 is allocated. The transmission times of the remaining random access signals are also determined in the same manner. That is, a random access signal is transmitted at the transmission time 913 by using the uplink Tx/Rx beam pair (TX1, RX3) and the random access resource 903, a random access signal is transmitted at the transmission time 914 by using the uplink Tx/Rx beam pair (TX1, RX4) and the random access resource 904, a random access signal is transmitted at the transmission time 915 by using the uplink Tx/Rx beam pair (TX1, RX5) and the random access resource 905, . . . , a random access signal is transmitted at the transmission time 91N by using the uplink Tx/Rx beam pair (TX1, RXN) and the random access resource 90N.

In the uplink transmission time determination method shown in FIG. 9C, the MS establishes downlink frame synchronization, based on received downlink signals. In consideration of the fact that downlink Tx/Rx beams have different propagation delays, the MS determines the time delayed by a predetermined period of time from the starting time of each uplink random access resource (determined based on its downlink frame boundary,) as the transmission times of random access signals. In contrast to the method of FIG. 9B, the method of FIG. 9C considers the different propagation delays of downlink Tx/Rx beams. In FIG. 9C, for example, when the MS establishes its downlink frame boundary, based on the reception time of the reference signal having the smallest propagation delay among the uplink reference signals received by the MS in FIG. 7, (that is, the reference signal 3 received through the downlink Tx/Rx beam pair (TX3, RX1) 823, 811) the transmission time of a random access signal transmitted by the MS through an uplink Tx/Rx beam pair (TXa, RXb) is determined in consideration of the propagation delay difference between the downlink Tx/Rx beam pair (TXb, RXa) corresponding to the uplink Tx/Rx beam pair and the downlink Tx/Rx beam pair (TX3, RX1) 823, 811 that is the reference of the downlink frame boundary. As an example, the uplink Tx/Rx beam pair (TX1, RX3) corresponding to the downlink Tx/Rx beam pair (TX3, RX1) 823, 811 carries a random access signal by using the random access resource 903 for the uplink Tx/Rx beam pair. The transmission time of the random access signal is determined in consideration of the difference between the propagation delays of the reference signal 3 received through the downlink Tx/Rx beam pair (TX3, RX1) 823, 811 and the reference signal received through the downlink Tx/Rx beam pair (TX3, RX1) 823, 811 that is the reference of the downlink frame boundary. Of course, since the downlink Tx/Rx beam pair (TX3, RX1) 823, 811 is the reference of the downlink frame boundary in FIG. 7, and thus there is no relative propagation delay. The transmission time of the random access signal that is transmitted using the uplink Tx/Rx beam pair (TX1, RX3) and the random access resource 903 in FIG. 9C corresponds to the time that is the same as the starting point of the interval where the random access resource 903 is allocated.

Contrarily, for the Rx beam 1 711 of the MS, the transmission time of the random access signal that is transmitted using the random access resource 902 and the uplink Tx/Rx beam pair (TX1, RX2) corresponding to the downlink Tx/Rx beam pair (TX2, RX1) 722, 711 through which the reference signal 2 having the second smallest propagation delay is received corresponds to the time that is delayed, from the starting time of the interval where the random access resource 902 is allocated, by the relative propagation delay time 922 of the reference signal 2 received through the downlink Tx/Rx beam pair (TX2, RX1) 722, 711 with respect to the reference signal 3 received through the Tx/Rx beam pair (TX3, RX1) 823, 811 that is the reference of the downlink frame boundary. In the same manner, for the Rx beam 1 711 of the MS, the transmission time of each of the random access signals that are transmitted using the random access resources 905, 904, 901, . . . , 90N and the uplink Tx/Rx beam pairs (TX1, RX5), (TX1, RX4), (TX1, RX1), (TX1, RXN) corresponding to the downlink Tx/Rx beam pairs (TX5, RX1) 725, 711, (TX4, RX1) 724, 711, (TX1, RX1) 721, 711, . . . , (TXN, RX1) 72N, 711 through which the reference signals having the third smallest propagation delay to the largest propagation delay are received corresponds to the time that is delayed, from each of the starting times of the intervals where the random access resources 905, 904, 901, . . . , 90N are allocated, by the relative propagation delay time 925, 924, 921, . . . , 92N of each of the reference signals received through the downlink Tx/Rx beam pairs (TX5, RX1) 725, 711, (TX4, RX1) 724, 711, (TX1, RX1) 721, 711, . . . , (TXN, RX1) 72N, 711 with respect to the reference signal 3 received through the Tx/Rx beam pair (TX3, RX1) 823, 811 that is the reference of the downlink frame boundary.

Hereinafter, a description will be given of a method of receiving random access signals from a MS by using one or more Rx beams, determining a TA value for correcting the uplink signal transmission time of the MS, and signaling the determined TA value to the MS by a BS.

FIG. 10 illustrates a method of determining a TA value for the uplink signal transmission time of a mobile station and signaling the determined TA value to the mobile station according to embodiments of the present disclosure.

Referring to FIG. 10, a BS 1010 receives a random access channel (RACH), transmitted by a specific MS 1020 through one or more Tx beams, by using one or more Rx beam (1001). Subsequently, the BS 1010 calculates a TA value for the uplink signal transmission time of the MS 1020 by using the received RACH, and transmits the calculated TA value to the MS 1020 over a predetermined signaling channel, for example, a physical downlink control channel (PDCCH) (1002). The MS 1020 then establishes a subsequent connection in which the TA value is reflected (1003).

In the present disclosure, a BS can use the following methods to determine a TA value. Firstly, the BS determines the random access signal having the smallest propagation delay among random access signals received through at least one Tx/Rx beam pair. The BS determines a TA value, based on the reception time of the determined random access signal having the smallest propagation delay. Secondly, the BS determines a predetermined number of random access signals having the smallest propagation delay, that is, k smallest random access signals, among random access signals received through Tx/Rx beam pairs. The BS determines a TA value, based on the average of the reception times of the determined random access signals. The BS determines a TA value by the time difference between the reception time of a received random access signal and the starting time of an interval where a transmission resource for the random access signal is allocated, or the average of the time differences between the reception times of received random access signals and the starting times of intervals where transmission resources for the random access signals are allocated. For reference, the time difference corresponds to reference numeral 505 in the example of FIG. 5. The TA value can be determined using certain operations.

Figure 11:
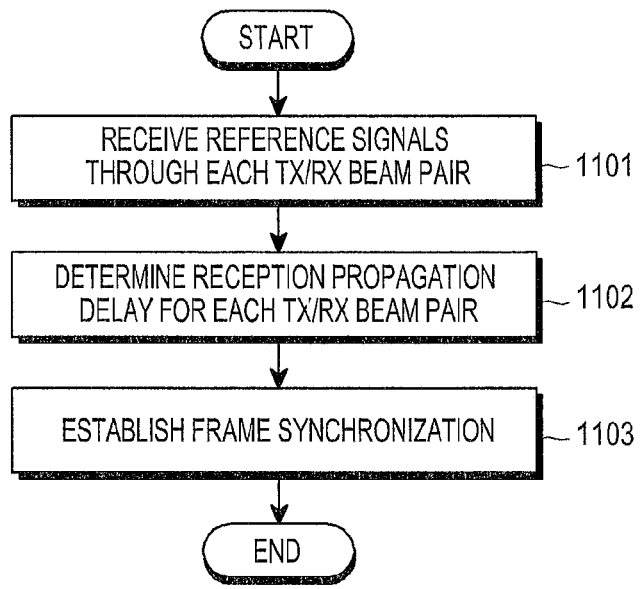
FIG. 11 illustrates a procedure of establishing downlink frame synchronization by a mobile station according to embodiments of the present disclosure.

FIG. 11 illustrates a procedure of establishing downlink frame synchronization by a mobile station according to embodiments of the present disclosure.

Although the procedure of FIG. 11 is divided into several process blocks and the respective process blocks will be described for the sake of convenience, the respective process blocks are not necessarily performed in sequence unless they are inconsistent or conflict with each other. Also, the respective process blocks may be omitted if desired.

In block 1101, the MS receives downlink reference signals by using one or more Rx beams, where the downlink reference signals are transmitted by a BS through one or more Tx beams. In block 1102, the MS determines the propagation delays and/or signal strengths of the received downlink reference signals according to different Tx/Rx beam pairs. Subsequently, in block 1103, the MS establishes the downlink frame boundary of the MS by using the methods described above in the examples of FIG. 8.

That is, firstly, the MS determines the reference signal having the smallest propagation delay among the received downlink reference signals, and establishes the time corresponding to the frame boundary of the determined reference signal as the downlink frame boundary of the MS. Secondly, the MS determines a predetermined number of reference signals having the smallest propagation delay among the received downlink reference signals, and establishes the average of the frame boundaries of the determined reference signals as the downlink frame boundary of the MS. Thirdly, the MS determines the strongest reference signal among the received downlink reference signals, and establishes the time corresponding to the frame boundary of the determined strongest reference signal as the downlink frame boundary of the MS. Fourthly, the MS determines k strongest reference signals among the received downlink reference signals, and establishes the average of the frame boundaries of the determined reference signals as the downlink frame boundary of the MS. However, depending on implementations, the above methods may be considered in combination. That is, the frame boundaries may also be determined in consideration of the propagation delays and/or reception strengths of the received downlink reference signals.

Figure 12:
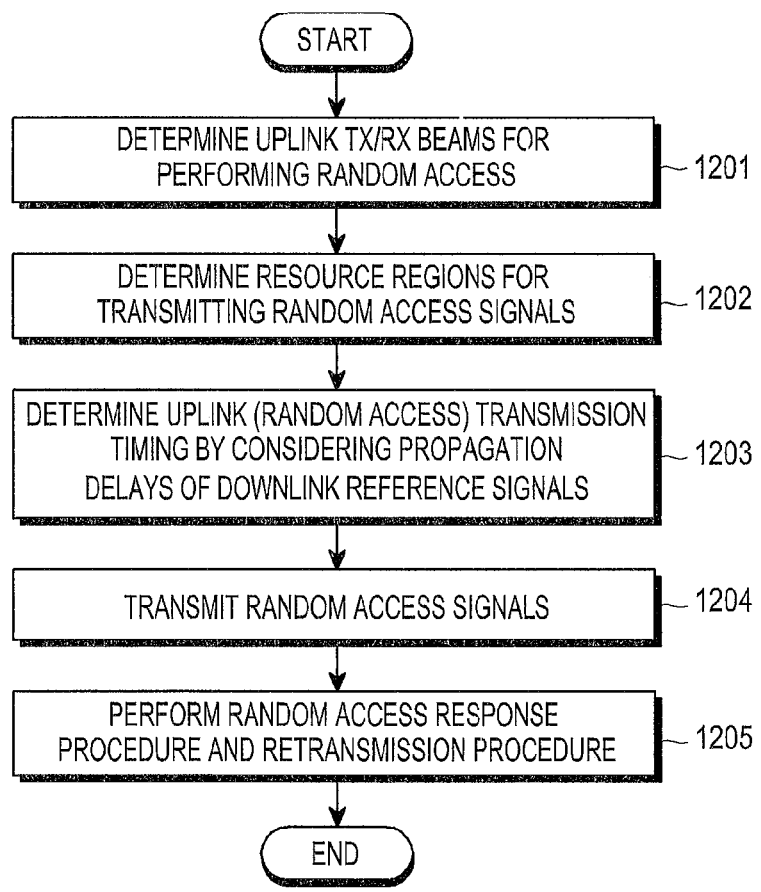
FIG. 12 illustrates a procedure of determining the transmission times of uplink random access signals by a mobile station according to embodiments of the present disclosure.

FIG. 12 illustrates a procedure of determining the transmission times of uplink random access signals by a mobile station according to embodiments of the present disclosure.

Although the procedure of FIG. 12 is divided into several process blocks and the respective process blocks will be described for the sake of convenience, the respective process blocks are not necessarily performed in sequence unless they are inconsistent or conflict with each other. Also, the respective process blocks may be omitted if desired.

In block 1201, the MS determines one or more uplink Tx/Rx beam pairs to be used for random access signal transmission. In determining the uplink Tx/Rx beam pairs, the MS considers the reception strengths and/or reception propagation delays of downlink reference signals received using one or more downlink Tx/Rx beams. In block 1202, the MS determines resource regions where random access signals are to be transmitted through the uplink Tx/Rx beam pairs determined in block 1201. The resource regions for random access signal transmission can be determined based on system information transmitted by a BS, or can be determined according to a predetermined rule between the BS and the MS. In block 1203, the MS determines the transmission times of the random access signals. Subsequently, in block 1204, the MS transmits the random access signals to the BS by using the Tx/Rx beam pairs determined in block 1201 and the random access resources determined in block 1202. In block 1205, the MS completes the random access procedure by receiving random access responses from the BS in response to the transmitted random access signals, and subsequently performing a procedure of retransmitting the random access signals.

For reference, in block 1203, the transmission times of the random access signals are determined using the uplink transmission time determination methods as described above in FIGS. 9A-9C. Firstly, as described in FIG. 9B, each starting time of the intervals where the random access resources are allocated is determined as the transmission time of each random access signal, but this method does not consider the fact that downlink Tx/Rx beams have different propagation delays. Secondly, as described above in FIG. 9C, in consideration of the fact that downlink Tx/Rx beams have different propagation delays, the time delayed by a predetermined period of time from each starting time of the intervals where the random access resources are allocated is determined as the transmission time of each uplink random access signal.

FIG. 13 illustrates a procedure of determining a TA value for the uplink signal transmission time of a specific mobile station by a base station according to embodiments of the present disclosure.

Although the procedure of FIG. 13 is divided into several process blocks and the respective process blocks will be described for the sake of convenience, the respective processes are not necessarily performed in sequence unless they are inconsistent or conflict with each other. Also, the respective process blocks may be omitted if desired.

In block 1301, the BS receives random access signals, transmitted by the MS through one or more uplink Tx beams, by using one or more Rx beams. In block 1302, the BS determines the propagation delays and/or signal strengths of the received random access signals according to different Tx/Rx beam pairs. In block 1303, the BS determines a TA value for the uplink signal transmission time of the MS. Subsequently, in block 1304, the BS completes the random access reception procedure by informing the MS of the determined TA value for the uplink signal transmission time of the MS through predetermined signaling, for example, random access responses and subsequently performing a random access retransmission procedure between the corresponding MS and the BS.

In the present disclosure, the BS can use the following methods to determine a TA value in block 1303. Firstly, the BS determines the random access signal having the smallest propagation delay among random access signals received through at least one Tx/Rx beam pair, and determines a TA value, based on the reception time of the determined random access signal having the smallest propagation delay. Secondly, the BS determines a predetermined number of random access signals having the smallest propagation delay, that is, k smallest random access signals, among random access signals received through Tx/Rx beam pairs. The BS determines a TA value, based on the average of the reception times of the determined random access signals. The BS can determine a TA value by the time difference between the reception time of a received random access signal and the starting time of an interval where a transmission resource for the random access signal is allocated. Or, the BS can determine a TA value by the average of the time differences between the reception times of received random access signals and the starting times of intervals where transmission resources for the random access signals are allocated. For reference, the time difference corresponds to reference numeral 505 in the example of FIG. 5. The TA value can be determined using certain operations.

Figure 14:
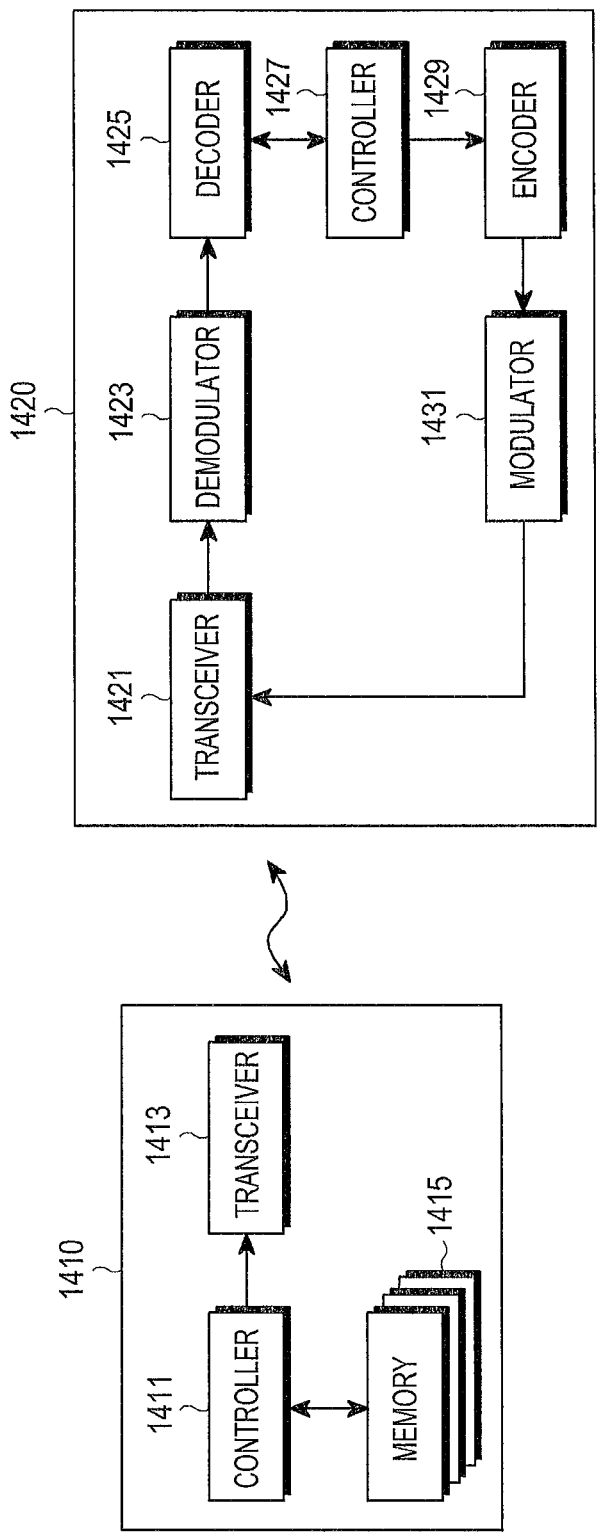
FIG. 14 illustrates an example of a configuration of a base station and a configuration of a mobile station according to embodiments of the present disclosure.

FIG. 14 illustrates an example of a configuration of a base station and a configuration of a mobile station according to embodiments of the present disclosure.

The BS 1410 includes a controller 1411, a transceiver 1413, and a memory 1415. The controller 1411 controls the overall operation of the BS according to embodiments of the present disclosure. That is, the controller 1411 transmits a downlink signal to each MS through at least one Tx beam, based on the BS's own timing source or reference, and receives an uplink signal, transmitted by each MS, by using at least one Rx beam. Subsequently, the BS 1410 determines a transmission time correction value (TA value) for allowing each MS to correct the transmission timing of an uplink signal, based on the uplink signal received from each MS, and transmits the determined TA value to each MS through the transceiver 1413. The TA value is determined using the methods as described above in FIG. 10 and FIG. 13. The transceiver 1413 performs RF processing operations in order to transmit/receive downlink and uplink transmission/reception signals. The memory 1415 stores received signals if necessary, and stores data required for the controller 1411 to perform the operations according to embodiments of the present disclosure.

The MS 1420 includes a transceiver 1421, a demodulator 1423, a decoder 1425, a controller 1427, an encoder 1429, and a modulator 1431.

The transceiver 1421 performs necessary RF processing to perform data transmission/reception with the BS The demodulator 1423 demodulates a received signal and transfers the demodulated signal to the decoder 1425 The decoder 1425 decodes the demodulated signal and transfers the decoded signal to the controller 1427.

The encoder 1429 encodes a signal received from the controller 1427 and transfers the encoded signal to the modulator 1431 The modulator 1431 modulates the encoded signal and transfers the modulated signal to the transceiver 1421. The demodulator 1423, the decoder 1425, the encoder 1429, and the modulator 1431 can be integrated into a data processor.

The controller 1427 controls the overall operation of the MS according to embodiments of the present disclosure. That is, the controller 1427 controls the MS 1420 to receive downlink reference signals by using one or more Rx beams, where the downlink reference signals are transmitted by the BS through one or more Tx beams. The controller 1427 determines the propagation delays of the downlink reference signals received through the different Tx/Rx beam pairs. Also, the controller 1427 establishes the downlink frame boundary of the MS. The methods of establishing the frame boundary of the MS have been described above in FIG. 8 and FIG. 11, so a detailed description thereof will be omitted here. Further, the controller 1427 determines the transmission time of an uplink signal after establishing frame synchronization. The methods of establishing the uplink transmission time have been described above in FIG. 9A-C and FIG. 12, so a detailed description thereof will be omitted here.

Some aspects of the present disclosure can also be implemented as a computer readable code in a computer readable recording medium. The computer readable recording medium is any type of data storage device capable of storing data readable by a computer system. Examples of the computer readable recording medium include a read-only memory (ROM), a random access memory (RAM), a CD-ROM, a magnetic tape, a floppy disk, an optical data storage device, and a carrier wave (such as data transmission through the Internet). The computer readable recording medium can also be distributed over network-coupled computer systems so that the computer readable code is stored and executed in a distributed fashion. Further, functional programs, codes, and code segments for achieving the present disclosure may be readily interpreted by programmers skilled in the art to which the present disclosure pertains.

It will be understood that a method and apparatus according to embodiments of the present disclosure can be implemented in the form of hardware, software, or a combination of hardware and software. Any such software can be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It will also be understood that a method and apparatus according to embodiments of the present disclosure may be implemented by a computer or portable terminal including a controller and a memory, and the memory is an example of a machine readable device adapted to store a program or programs including instructions for implementing embodiments of the present disclosure.

Accordingly, the present disclosure includes a program including a code for implementing the apparatus or method described in any of the appended claims of the specification and a machine (computer or the like) readable storage medium for storing the program. Further, the program can be electronically carried by any medium such as a communication signal transferred through a wired or wireless connection, and the present disclosure appropriately includes equivalents thereof.

Further, an apparatus according to embodiments of the present disclosure can receive the program from a program providing device that is wiredly or wirelessly connected thereto, and can store the program. The program providing device can include a program including instructions through which a program processing device performs a preset content protecting method, a memory for storing information and the like required for the content protecting method, a communication unit for performing wired or wireless communication with the program processing device, and a controller for transmitting the corresponding program to a transceiver at the request of the program processing device or automatically.

Although the present disclosure has been described with embodiments, various changes and modifications may be suggested to one skilled in the art. It is intended that the present disclosure encompass such changes and modifications as fall within the scope of the appended claims.

What is claimed is:

1. A method of communicating with a base station by a mobile station in a communication system, the method comprising:

receiving, by a mobile station a plurality of downlink signals transmitted through a plurality of downlink beam pairs, each downlink beam pair including a transmission beam and a reception beam;

determining, by the mobile station, a propagation delay for each of the plurality of downlink signals;

selecting, by the mobile station, at least one downlink signal among the plurality of downlink signals based on the propagation delay for each of the plurality of downlink signals; and determining, by the mobile station, a downlink frame boundary of the mobile station based on the selected at least one downlink signal.

2. The method of claim 1, wherein selecting at least one downlink signal comprises selecting a predetermined number of downlink signals in order of smallest propagation delay among the plurality of downlink signals, and wherein determining the downlink frame boundary comprises performing an operation using frame boundaries of the predetermined number of downlink signals, the method further comprising:

determining a value of the operation as the frame boundary of the mobile station.

3. The method of claim 2, wherein the operation using frame boundaries is an average operation using the frame boundaries.

4. The method of claim 1, further comprising:

determining at least one beam pair for transmitting at least one uplink signal based on the propagation delay determined for each of the plurality of downlink beam pair signals; and determining a transmission resource for transmitting the at least one uplink signal.

5. The method of claim 4, further comprising:
defining a transmission time of the at least one uplink signal as a starting time of an interval where the determined transmission resource is allocated; and
transmitting the at least one uplink signal at the transmission time by using the determined beam pairs and the determined transmission resource.

6. The method of claim 4, further comprising:
defining the transmission time of the at least one uplink signal based on the propagation delay for each of the plurality of downlink signals; and
transmitting the at least one uplink signal at the transmission time by using the determined beam pairs and the determined transmission resource.

7. A method of communicating with a base station by a mobile station in a communication system, the method comprising:
receiving, by a mobile station, a plurality of downlink signals transmitted through a plurality of downlink beam pairs, each downlink beam pair including a transmission beam and a reception beam;
determining, by the mobile station, a signed strength for each of the plurality of downlink signals;
selecting, by the mobile station, a predetermined number of downlink signals having a in order of strongest signal strength among the plurality of downlink signals;
performing, by the mobile station, an operation using frame boundaries of the predetermined number of downlink signals; and
determining, by the mobile station, a value of the operation as the frame boundary of the mobile station,
wherein the predetermined number is an integer larger than 1.

8. The method of claim 7, wherein the operation using frame boundaries is an average operation using the frame boundaries.

9. The method of claim 7, further comprising:
determining at least one beam pair for transmitting at least one uplink signal based on the signal strength determined for each of the plurality of downlink signals; and
determining a transmission resource for transmitting the at least one uplink signal.

10. The method of claim 9, further comprising:
defining a transmission time of the at least one uplink signal as a starting time of an interval where the determined transmission resource is allocated; and
transmitting the at least one uplink signal at the transmission time by using the determined beam pairs and the determined transmission resource.

11. The method of claim 9, further comprising:
defining the transmission time of the at least one uplink signal based on the signal strength for each of the plurality of downlink signal; and
transmitting the at least one uplink signal at the transmission time by using the determined beam pairs and the determined transmission resource.

12. A method of determining a timing advance (TA) value for an uplink transmission time of a mobile station by a base station in a communication system, the method comprising:
receiving, by the base station, a plurality of uplink signals transmitted through a plurality of uplink beam pairs, each uplink beam pair including a reception beam and a transmission beam;
determining, by the base station, at least one of a propagation delay and a signal strength for each of the plurality of uplink signals;
selecting, by the base station, at least one uplink signal among the plurality of uplink signals based on the at least one of the propagation delay and the signal strength for each of the plurality of uplink signals; and
determining, by the base station, based on the selected at least one uplink signal.

13. The method of claim 12, wherein selecting at least one uplink signal comprises selecting a predetermined number of uplink signals in order of smallest propagation delay among the plurality of uplink signals, and wherein determining the TA value comprises determining the TA value, based on an operation using reception times of the predetermined number of uplink signals.

14. The method of claim 13, wherein the operation using the reception times is an average operation using the reception times.

15. The method of claim 12, wherein the determining of the TA value comprises determining the TA value by a difference between a reception time of the uplink signal received by the base station and a starting time of an interval where a transmission resource for transmitting the at least one uplink signal is allocated.

16. The method of claim 12, further comprising informing the mobile station of the determined TA value for the uplink signal transmission time of the MS through random access signaling.

17. A mobile station, comprising:
a transceiver configured to receive a plurality of downlink signals transmitted through a plurality of downlink beam pairs including a transmission beam and a reception beam; and
a controller configured to:
determine a propagation delay for each of the plurality of downlink signals,
select at least one downlink signal among the plurality of downlink signals based on the propagation delay for each of the plurality of downlink signals, and
determine a downlink frame boundary of the mobile station based on the selected at least one downlink signal.

18. The mobile station of claim 17, wherein the controller is configured to:
select a predetermined number of downlink signals in the order of the smallest propagation delay among the plurality of downlink signals, and
determine the downlink frame boundary by:
performing an operation using frame boundaries of the predetermined number of downlink signals,
determining a value of the operation as the frame boundary of the mobile station.

19. The mobile station of claim 18, wherein the operation using frame boundaries is an average operation using the frame boundaries.

20. The mobile station of claim 17, wherein the controller is further configured to determine at least one beam pair for transmitting at least one uplink signal based on the propagation delay determined for each of the plurality of downlink signals, and determine a transmission resource for transmitting the at least one uplink signal.

21. The mobile station of claim 20, wherein the controller is further configured to define a transmission time of the at least one uplink signal as a starting time of an interval where the determined transmission resource is allocated, and transmit the at least one uplink signal at the transmission time by using the determined beam pairs and the determined transmission resource.

22. The mobile station of claim 20, wherein the controller is further configured to define the transmission time of the at least one uplink signal based on the propagation delay for each of the plurality of downlink signals, and transmit the at least one uplink signal at the transmission time by using the determined beam pairs and the determined transmission resource.

23. A mobile station, comprising:
a transceiver configured to receive a plurality of downlink signals transmitted through a plurality of downlink beam pairs, each downlink beam pair including a transmission beam and a reception beam; and
a controller configured to:
determine a signal strength for each of the plurality of downlink signals,
select a predetermined number of downlink signals in order of strongest signal strength among the plurality of downlink signals,
perform an operation using frame boundaries of the predetermined number of downlink signals, and
determine a value of the operation as a frame boundary of the mobile station,
wherein the predetermined number is an integer larger than 1.

24. The mobile station of claim 23, wherein the operation using frame boundaries is an average operation using the frame boundaries.

25. The mobile station of claim 23, wherein the controller is further configured to determine at least one beam pair for transmitting at least one uplink signal based on the signal strength determined for each of the plurality of downlink signals, and determine a transmission resource for transmitting the at least one uplink signal.

26. The mobile station of claim 25, wherein the controller is further configured to define a transmission time of the at least one uplink signal as a starting time of an interval where the determined transmission resource is allocated, and transmit the at least one uplink signal at the transmission time by using the determined beam pairs and the determined transmission resource.

27. The mobile station of claim 25, wherein the controller is further configured to define the transmission time of the at least one uplink signal based on the signal strength for each of the plurality of downlink signal, and transmit the at least one uplink signal at the transmission time by using the determined beam pairs and the determined transmission resource.

28. A base station, comprising:
a transceiver configured to receive a plurality of uplink signals transmitted through a plurality of uplink beam pairs, each uplink beam pair including a transmission beam and a reception beam; and
a controller configured to:
determine at least one of a propagation delay and a signal strength for each of the plurality of uplink signals,
select at least one uplink signal among the plurality of uplink signals based on the at least one of the propagation delay and the signal strength for each of the plurality of uplink signals, and
determining the TA value based on the selected at least one uplink signal.

29. The base station of claim 28, wherein the controller is configured to:
select a predetermined number of uplink signals in order of smallest propagation delay among the plurality of uplink signals, and
determine the TA value, based on an operation of reception times of the predetermined number of uplink signals.

30. The base station of claim 29, wherein the operation using the reception times is an average operation using the reception times.

31. The base station of claim 28, wherein the controller is configured to determine the TA value by a difference between a reception time of at least one uplink signal received by the base station and a starting time of an interval where a transmission resource for transmitting the at least one uplink signal is allocated.

32. The base station of claim 28, wherein the controller is further configured to inform the mobile station of the determined TA value for the uplink signal transmission time of the MS through random access signaling.

* * * * *